United States Patent [19]

Yoshida et al.

[11] Patent Number: 5,996,111
[45] Date of Patent: Nov. 30, 1999

[54] IDENTIFICATION SEQUENCE ISSUING DEVICE AND IDENTIFICATION SEQUENCE VERIFICATION DEVICE

[75] Inventors: Hideo Yoshida; Takahiko Nakamura; Keiichi Nishikawa, all of Tokyo, Japan

[73] Assignee: Mitsubishi Denki Kabushiki Kaisha, Tokyo, Japan

[21] Appl. No.: 08/736,914

[22] Filed: Oct. 25, 1996

[51] Int. Cl.$^6$ ............................................... H03M 13/00
[52] U.S. Cl. ........................................................ 714/784
[58] Field of Search ........................ 371/37.11; 714/784

[56] References Cited

U.S. PATENT DOCUMENTS

| | | | |
|---|---|---|---|
| 3,970,992 | 7/1976 | Boothroyd et al. | 340/172.5 |
| 4,943,707 | 7/1990 | Boggan | 235/380 |
| 5,253,345 | 10/1993 | Fernandes et al. | 395/275 |
| 5,285,451 | 2/1994 | Henson et al. | 371/11.1 |
| 5,377,207 | 12/1994 | Perlman | 371/37.1 |
| 5,424,524 | 6/1995 | Ruppert et al. | 235/462 |
| 5,436,970 | 7/1995 | Ray et al. | 380/23 |
| 5,479,515 | 12/1995 | Longacre, Jr. | 380/54 |
| 5,479,530 | 12/1995 | Nair et al. | 382/119 |

OTHER PUBLICATIONS

Ramabadran et al., "A Tutorial on CRC Computations", IEEE Micro, Aug. 1988, pp. 62–74.

Arazi, "A Commonsense Approach to the Theory of Error Correcting Codes", MIT Press, Dec. 1988, pp. 137–140.

Blahut, "Theory and Practice of Error Control Codes", Addison–Wesley Pub. Co., Dec. 1983, p. 174.

Verdú, Sergio and Wei, Victor K., "Explicit Construction of Optimal Constant–Weight Codes for Identification via Channels," *IEEE Transactions on Information Theory*, vol. 39, No. 1 (Jan. 1993), pp. 30–36.

Han, Te Sun and Verdú, Sergio, "New Results in the Theory of Identification via Channels," *IEEE Transactions on Information Theory*, vol. 38, No. 1 (Jan. 1992), pp. 14–25.

*Primary Examiner*—Stephen M. Baker
*Attorney, Agent, or Firm*—Burns, Doane, Swecker & Mathis, LLP

[57] ABSTRACT

An identification sequence issuing device comprising a code converter portion for converting an identification sequence character string that may include letters, numerals, and the like, into a string of character codes having one-to-one correspondence to the characters in the character string, and a check and selection portion for selecting as an identification sequence the character string corresponding to a character code string that is determined to meet a Reed-Solomon code rule with each character code being a symbol of the Reed-Solomon code and the character code string length being the length of the Reed-Solomon code. The identification sequence is issued based on the Reed-Solomon code of a generating polynomial having a plurality of initial elements as roots, and for additional issuing, identification sequences are issued based on the Reed-Solomon code with the number of roots of the generating polynomial reduced by 1.

12 Claims, 7 Drawing Sheets

IDENTIFICATION SEQUENCE ISSUING DEVICE AND IDENTIFICATION SEQUENCE VERIFICATION DEVICE

BACKGROUND OF THE INVENTION

1. Field of the Invention

The present invention relates to an identification sequence issuing device for an identification sequence that is issued for the verification of the identity of an individual and an identification sequence verification device that verifies the identification sequence, and the present invention particularly considers error detection and error correction at the input of the identification sequence without giving a sense of unnaturalness in operation.

2. Description of the Related Art

The identification sequence method is an indispensable method to recognize a particular user in a card system, a payment system or the like, and finds applications in a diversity of fields.

In the card system, identification sequence information is written on a card, and is authenticated by an identification sequence a user can easily remember. On the other hand, in a payment system in which service is provided to a particular user, authentication is typically performed by transmitting to the user an identification sequence for verifying the identity of the user, and by allowing the user to input the identification number or identification sequence.

The identification sequence used in the payment system requires a larger-number of digits than the card system. To help the user remember the identification sequence, it may include letters, such as ABC and the like, in addition to numbers.

When the user inputs the identification sequence, a system conventionally performs an all-number search for the identification sequences issued to determine whether the input identification sequence agrees with any of the issued identification sequences.

If the identification sequence has a large number of digits, it is subject to an error in transmission, and the user is likely to input an erroneous number. For this reason, when an identification sequence issued, a redundancy is provided to the identification sequence.

As an example of the prior art, Japanese Unexamined Patent Publication (Kokai) No. 4-40128 uses an identification sequence that is made of an increment identification sequence with a redundancy bit added.

Figure 8:
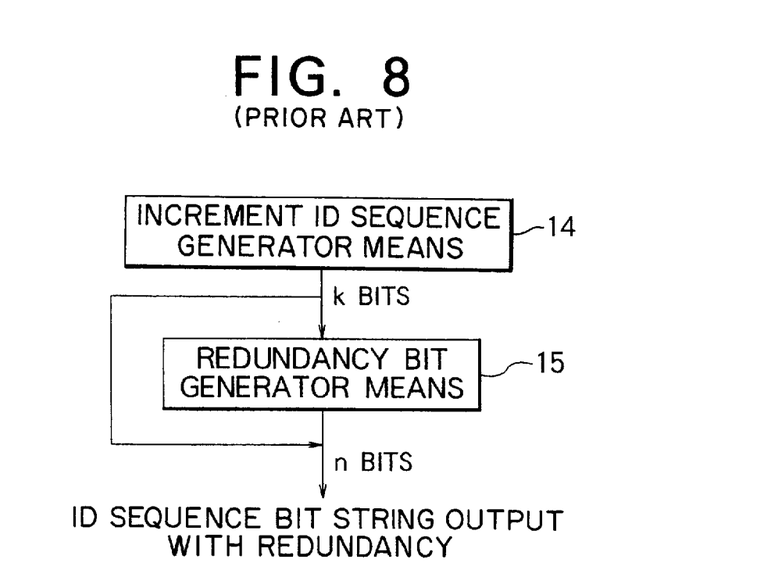
FIG. 8 is a block diagram showing the prior art identification sequence issuing device.

FIG. 8 is a block diagram of a device that generates such a prior art identification sequence with a redundancy added, in which there is shown an increment ID sequence generating means 14 for generating an increment identification sequence, for example, using a counter or the like, and a redundancy bit generating means 15 for adding a redundancy bit to the increment identification sequence generated by the increment ID sequence generating means 14.

The prior art identification sequence having a redundancy comprises an original identification sequence portion and a redundancy portion added thereto. For example, the prior art redundancy bit generating means 15 can provide for the correction an error of 1 bit in the identification sequence by generating a check bit of the systematic code of a Hamming code of a generating polynomial $g(x)=x^3+x+1$.

Figure 9:
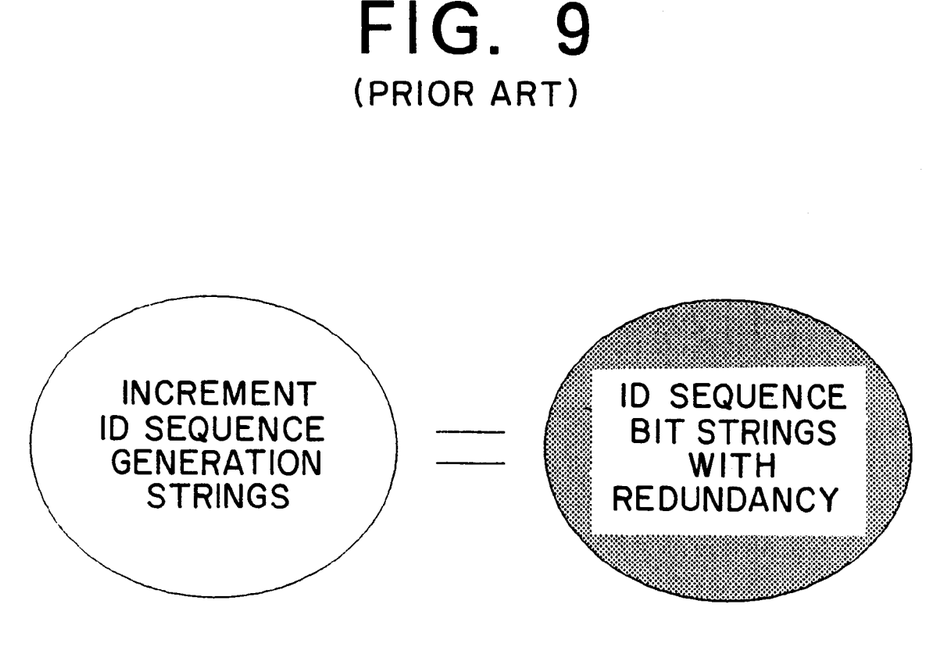
FIG. 9 is a diagram showing the set of the prior art identification sequence generated.

FIG. 9 is a diagram showing the method of generating identification sequences with redundancy represented by sets, in which the number of elements of increment identification sequences that are a source corresponds to the number of identification sequences with redundancy added.

The authentication is conventionally performed as above, and has the following problems.

Firstly, since the prior art adds a redundancy bit to an increment identification sequence, the identification sequence is in principle expressed by a bit format or a number only. This makes an identification sequence difficult for a user to remember.

Secondly, since, in the prior art, the identification sequence is of fixed length and the increment identification sequence length and redundancy bit length of the increment ID sequence generating means are fixed, then error detection and correction capabilities are fixed regardless of the number of issued identification sequences. A identification sequences greater length than the length of identification sequences generated by the increment ID sequence generating means 14 cannot be issued.

SUMMARY OF THE INVENTION

The present invention has been developed to solve the above problems. According to a first aspect of the present invention, there is provided an identification sequence issuing device for issuing an identification sequence constructed from a character string, such as a series of letters, numerals, and other characters, comprising a code converter means for converting the character string into a string of character codes, each character code having one-to-one correspondence to a character in the character string, and check and selection means for determining whether the code converted by the code converter means meets a Reed-Solomon code rule with each character code being a symbol of the Reed Solomon code and the character code string length being the length of the Reed-Solomon code, and for selecting as an identification sequence the character string corresponding to the character code string that is determined to meet the Reed-Solomon code rule.

According to a second aspect of the present invention, the code converter means converts each character in the string into a 7-bit ASCII code having one-to-one correspondence to the character, and the check and selection means selects as an identification sequence the character string corresponding to the character code string converted by the code converter means that meets a Reed-Solomon code rule of $GF(2^7)$ with each character code being a symbol of the Reed Solomon code and the character code string length being the length of the Reed-Solomon code.

According to a third aspect of the present invention, the code converter means converts each character in the string into a 6-bit code having one-to-one correspondence to the character, and the check and selection means selects as an identification sequence the character string corresponding to the character code string converted by the code converter means that meets a Reed-Solomon code rule of $GF(2^6)$ with each character code being a symbol of the Reed Solomon code and the character code string length being the length of the Reed-Solomon code.

According to a fourth aspect of the present invention, the code converter means selects 32 characters out of alphabets or numerals and converts each of the selected characters into a 5-bit code having one-to-one correspondence to the character, and the check and selection means selects as an identification sequence the character string corresponding to the character code string converted by the code converter means that meets a Reed-Solomon code rule of $GF(2^5)$ with each character code being a symbol of the Reed Solomon code and the character code string length being the length of the Reed-Solomon code.

According to a fifth aspect of the present invention, the code converter means selects 16 characters out of alphabets or numerals and converts each of the selected characters into a 4-bit code having one-to-one correspondence to the character, and the check and selection means selects as an identification sequence the character string corresponding to the character code string converted by the code converter means that meets a Reed-Solomon code rule of $GF(2^4)$ with each character code being a symbol of the Reed Solomon code and the character code string length being the length of the Reed-Solomon code.

According to a sixth aspect of the present invention, the check and selection means selects as an identification sequence the character string corresponding to the character code string converted by the code converter means that meets a Reed-Solomon code rule of a generating polynomial having a plurality of Galois field elements as roots with the code being a symbol and the string of the symbol being a code length.

According to a seventh aspect of the present invention, in the device according to the sixth aspect of the present invention, when all identification sequences that meet the Reed-Solomon code rule of the generating polynomial having the plurality of Galois field elements as roots have been issued, the check and selection means additionally selects as an identification sequence the character string corresponding to the character code string that meets a Reed-Solomon code rule of the generating polynomial with one less root.

According to a eighth aspect of the present invention, the device according to the seventh aspect of the present invention comprises memory means for storing the latest identification sequence that is a character string constructed as a Reed-Solomon code and issued as an identification sequence in a sequence order by weight, and issuing means for issuing an identification sequence different from identification sequences which are already issued according to a sequence order by weight and which satisfy the generating polynomial.

According to a ninth aspect of the present invention, the device according to the first aspect of the present invention comprises the issuing means that selects and issues, as an identification sequence, according to a sequence order by weight, the character string selected by the check and selection means.

According to a tenth aspect of the present invention, the device according to the eighth aspect of the present invention comprises memory means for storing the latest identification sequence issued according to a sequence order by weight or the character code string having one-to-one correspondence to the latest issued identification sequence.

According to an eleventh aspect of the present invention, there is provided identification sequence verification device that comprises code converter means to which the identification sequence issued by the identification sequence issuing device of the first aspect of the present invention is input, and which converts the identification sequence into a character code string having one-to-one correspondence to the characters of the identification sequence, decoder means for decoding the character code string according to a Reed-Solomon code and detecting an error, and notifying means for notifying a person who inputs the identification sequence that the identification sequence is found to contain an error is due to an erroneous input.

According to a twelfth aspect of the present invention, the decoder means detects an error and corrects the identification sequence found to be erroneous, and recognizes the corrected data as an identification sequence.

According to a thirteenth aspect of the present invention, the device according to the twelfth aspect of the present invention comprises check means that checks whether the result of the error correction by the decoder means meets an identification sequence string rule.

According to a fourteenth aspect of the present invention, the device according to the twelfth aspect of the present invention comprises missing information generating means that notifies the decoder means, when the code corresponding to a character input is not found in the code converter means, of the position of the corresponding code string as an erasure position, and the decoder means corrects the erasure in response to the notification from the missing information generating means.

DESCRIPTION OF THE PREFERRED EMBODIMENTS

Embodiment 1.

Figure 1:
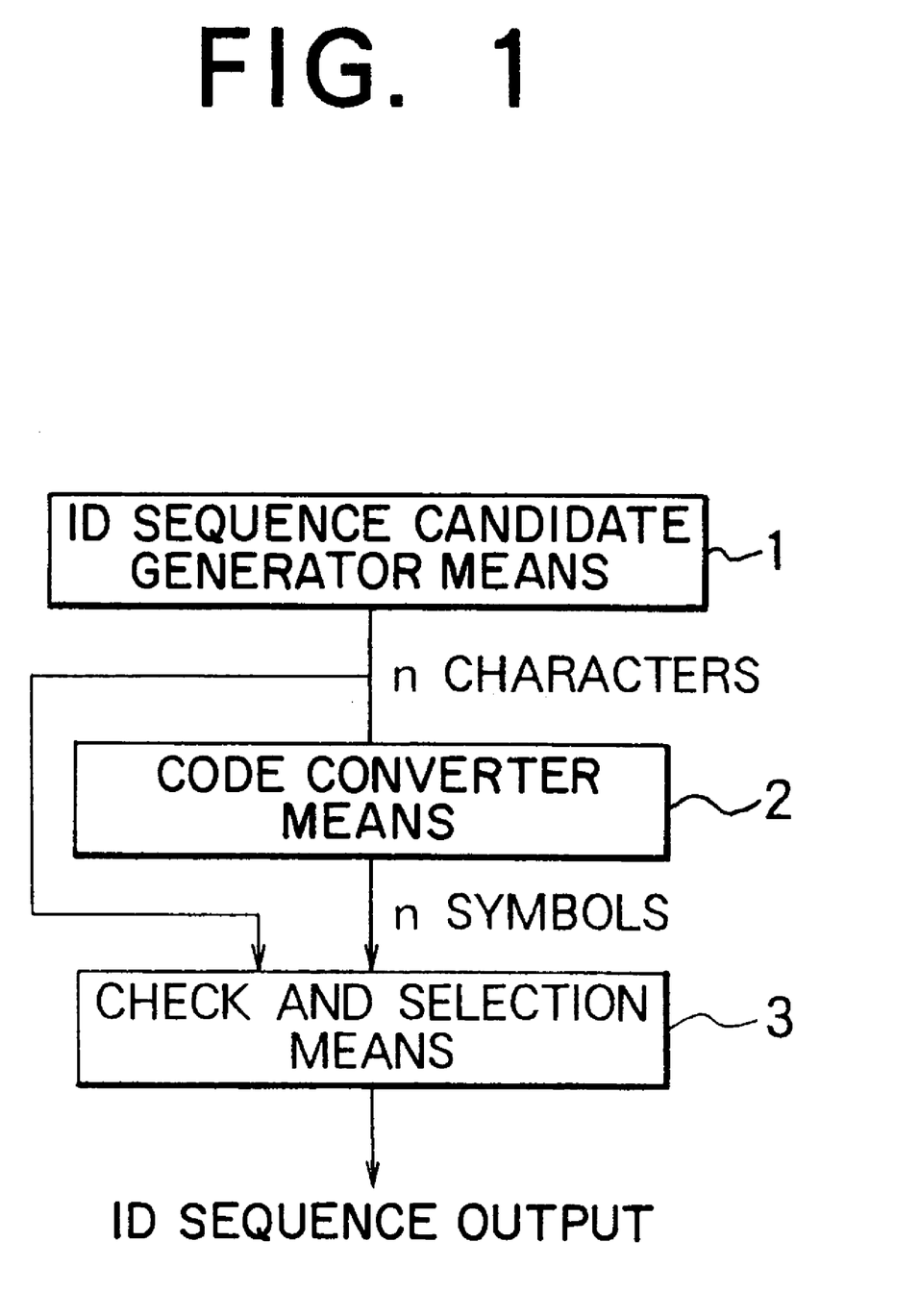
FIG. 1 is a block diagram showing the identification sequence issuing device of the embodiment 1 of the present invention.

FIG. 1 shows the organization of the identification sequence issuing device of the present invention, in which there are shown ID sequence candidate generator means 1 for generating an identification sequence candidate, code converter means 2 for converting the identification sequence candidate generated by the ID sequence candidate generator means 1 into an ASCII code, for example, and check and selection means 3 for checking whether the ASCII code string converted by the code converter means 2 meets the rule as the Reed-Solomon code and for selecting only the code string that meets the Reed-Solomon code rule.

Figure 2:
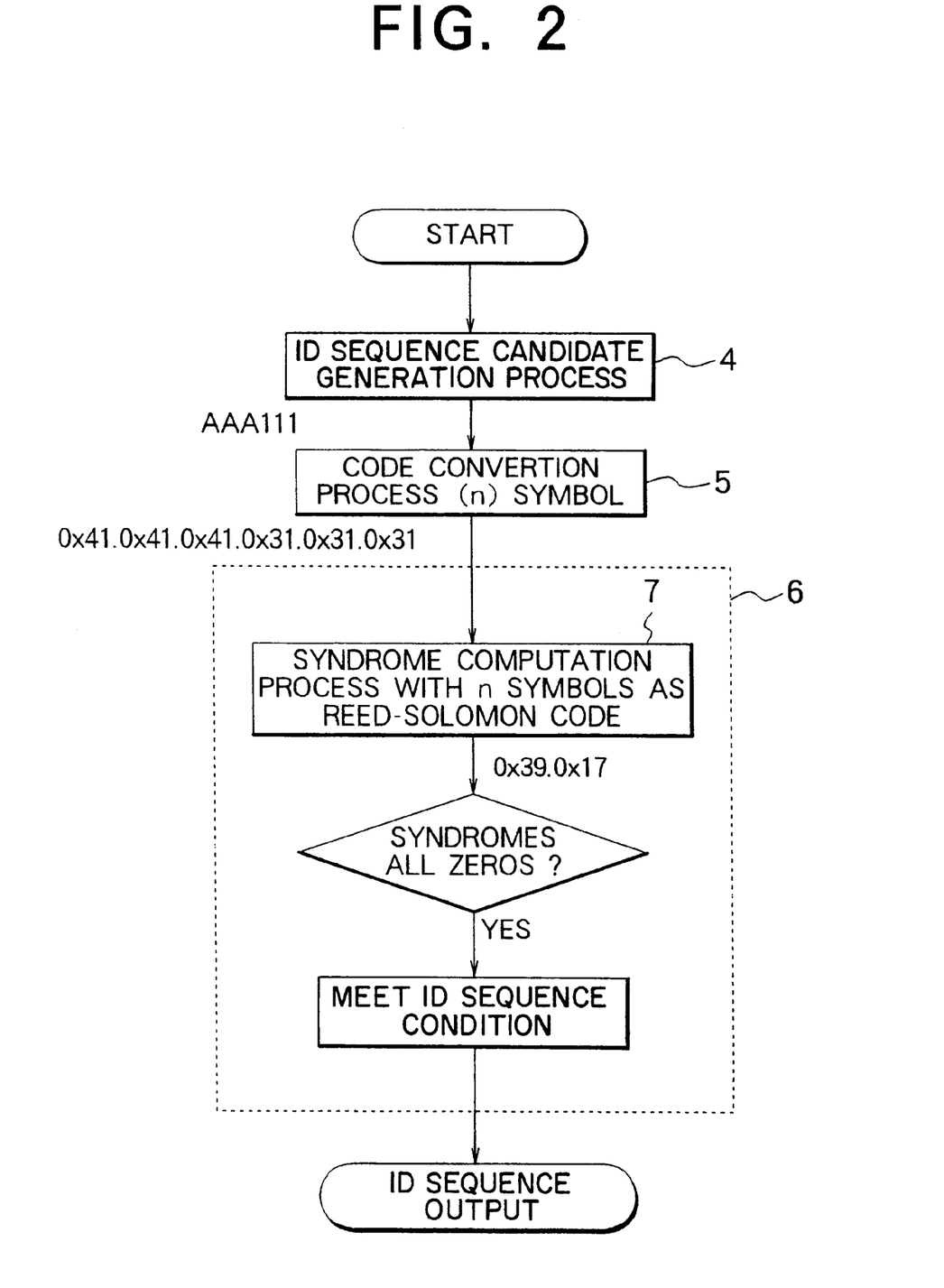
FIG. 2 is a flow diagram showing the identification sequence generation process in the identification sequence issuing device in FIG. 1.

FIG. 2 is a flow diagram showing the issuing process of an identification sequence in the identification sequence issuing device of the present invention.

Referring to FIGS. 1 and 2, the operation of the identification sequence issuing device is discussed. First, the ID sequence candidate generator means 1 generates n characters according to the format of an identification sequence system. By n it is meant a character length. This character is a string of letters or numerals, for example. By way of example, suppose that an identification sequence candidate in an identification sequence system is made up of three upper-case letters and three numbers like AAA111. This corresponds to Step 4 in FIG. 2. The generation of a character may be performed by a counter or the like, and a number generated may be used instead of the character.

The code converter means 2 converts the n characters in units of character into n symbol code strings in which a 7-bit ASCII code is a symbol. The above identification sequence candidate is 0×41, 0×41, 0×41, 0×31, 0×31, 0×31 in hexadecimal expression. This corresponds to Step 5, and is performed, for example through table conversion or the like using ROM (read only memory) or the like. This step may be performed by a counter that works as the ID sequence candidate generator means 1 as well.

The check and selection means 3 checks to see if the identification sequence candidate string meets conditions as the Reed-Solomon code, and selects and issues as an identification sequence the candidate string if the conditions are met. This corresponds to Step 6 in FIG. 2. Applied as an example of Reed-Solomon code rule is the rule of a Reed-Solomon code of $GF(2^7)$ with a source polynomial $x^7+x^6+1$, $\alpha^1$ and $\alpha^2$ as roots of a generating polynomial, and one symbol correctable.

In a specific method, a syndrome computation is performed on the identification sequence string as in Step 7 in FIG. 2, and if the syndromes corresponding to the roots $\alpha^1$ and $\alpha^2$ of the generating polynomial are all 0 (zero), the identification sequence string is issued as an identification sequence. In the above-described identification sequence candidate AAA111, the syndromes are 0×39 and 0×17, and fail to meet the issuing rule of an identification sequence, but AAC942 (ASCII codes are 0×41, 0×41, 0×43, 0×39, 0×34, 0×32 in hexadecimal) for example, results in syndromes 0×00, 0×00, and is thus selected and issued as an identification sequence.

Figure 3:
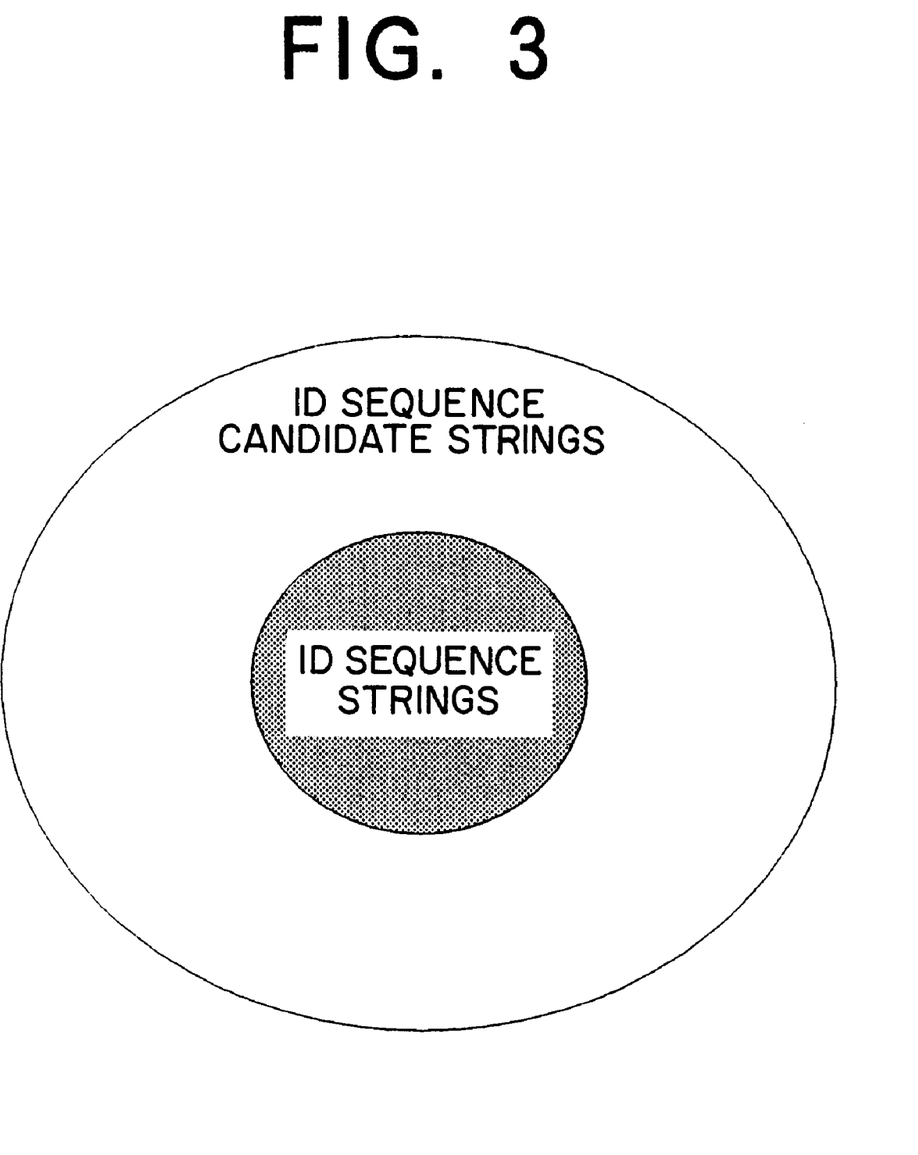
FIG. 3 is a diagram showing the set of identification sequences selected in the identification sequence generation according to the embodiment 1.

FIG. 3 shows the diagram showing the set according to the embodiment 1 corresponding to FIG. 9, with reference to which the prior art error correction in the issuing method is described. As seen from FIG. 3, according to the present invention, the identification sequence is issued by applying the condition as the Reed-Solomon code to candidates for identification sequences. Namely, the identification sequences are a subset of the character strings that are the identification sequence candidates. In the above identification sequence system, 17576000 identification sequence candidates are available, and among them, a subset that meets the above-described Reed-Solomon code rule includes 1073 numbers.

Embodiment 2.

According to the embodiment 1, the character of the identification sequence is converted into an ASCII code, and if the identification sequence is constructed of letters or characters and numerals, a total of 36 characters are used, and a code is constructed of 6 bits, and the identification sequence is organized according to the Reed-Solomon code rule of $GF(2^6)$.

Embodiment 3.

According to the embodiment 2, the identification sequence is constructed of letters or characters and numerals and any of the 36 characters may be placed in any position within the identification sequence string; alternatively, the identification sequence may be constructed of letters or characters only or letters or characters mixed with a numeral placed in a fixed position, and in this case, the number of character candidates is 26 characters, the code is constructed of 5 bits (permitting up to 32 characters), and the identification sequence is organized according to the Reed-Solomon code rule of $GF(2^5)$.

Embodiment 4.

According to the embodiment 3, the identification sequence is constructed of letters or characters only or letters or characters mixed with a numeral placed in a fixed position, alternatively, the identification sequence string is constructed of numerals only or 16 letters or characters, or both numerals and 16 letters or characters mixed but their positions fixed, or a combination of a total of 16 numerals and letters or characters selected from the numerals and letters or characters, and in this case, the maximum number of character candidates are 16 characters, the code is constructed of 4 bits, and the identification sequence is organized according to the Reed-Solomon code rule of $GF(2^4)$. According to the embodiment 1, in the identification sequence string of 6 digits, the count of identification sequences that are correctable in one symbol is 1073, and in this embodiment, 65536 identification sequences correctable in one symbol can be issued, and thus the count of issuable identification sequences is substantially increased.

Embodiment 5.

The Reed-Solomon code that is the rule of the identification sequence in the ID sequence candidate generator means 1 of the present invention is capable of detecting and correcting a plurality of characters, namely using a generating polynomial having a plurality of elements as roots. Taking advantage of this, the identification sequence issuing device of the present invention can issue new identification sequences with correction capability lowered a bit even if the number of issues of the identification sequences reaches its maximum available number.

Figure 4:
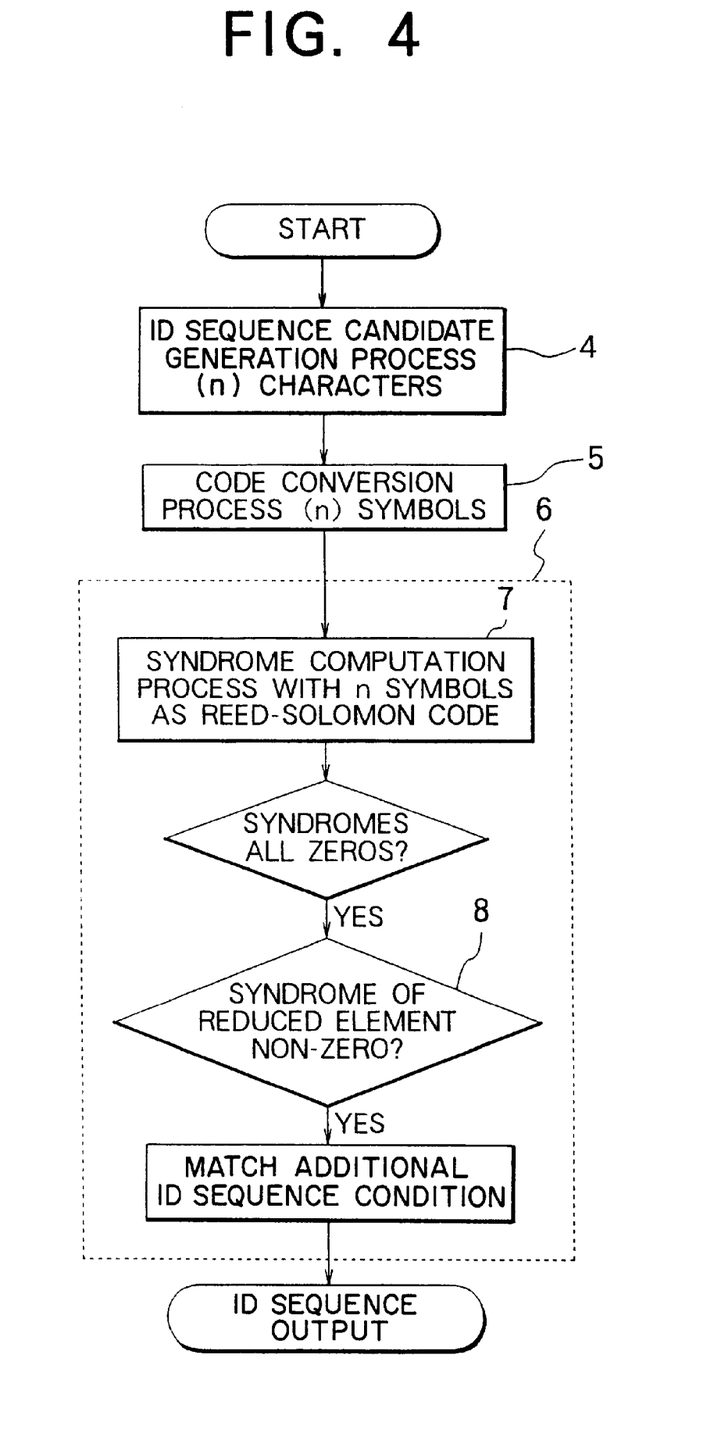
FIG. 4 is a flow diagram showing the identification sequence generation according to an embodiment 5 of the present invention.

FIG. 4 shows the additional issue process of identification sequences, in which the selection method by the check and selection means 3 in FIG. 1 is changed to Step 8 in FIG. 4 and thus the additional issuing of identification sequences is performed by simply reducing the error detection capability by 1.

At Step 8 in FIG. 4, the syndrome computation identical to that at Step 7 in FIG. 2 is performed, and as for generating elements reduced by 1 for additional issuing, the identification sequence string candidates having non-zero syndrome are issued as additional identification sequences.

Figure 5:
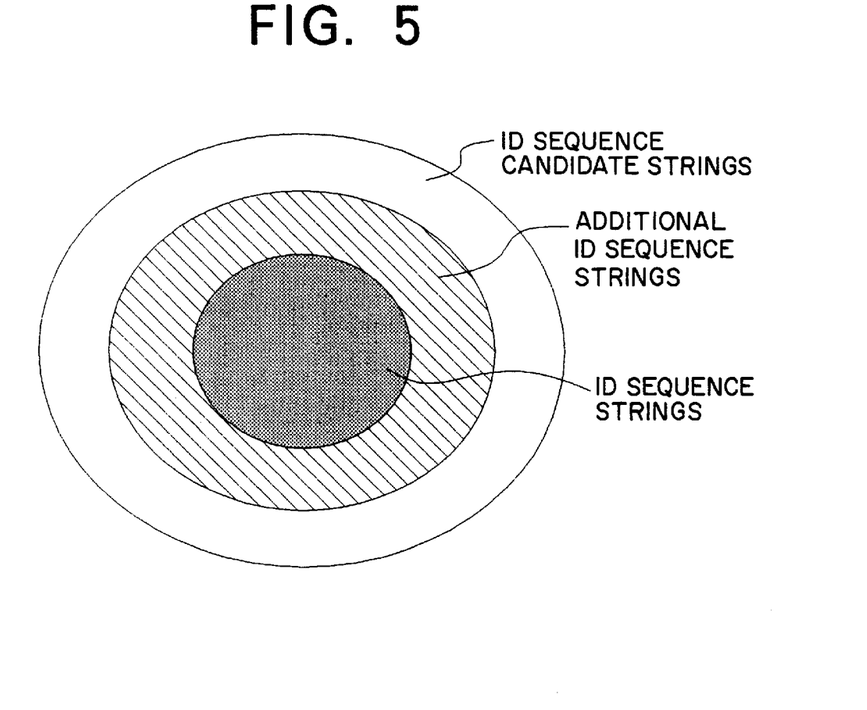
FIG. 5 is a diagram showing the set of identification sequences selected in the identification sequence generation according to the embodiment 5.

FIG. 5 shows the set of additional issues based on the diagram in FIG. 3. As shown in FIG. 5, the set inclusive of the identification sequences additionally issued includes the set of identification sequences before additional issuing as a proper subset, and the count of the identification sequences can be increased without the need for undergoing a major modification in system.

Embodiment 6.

Figure 6:
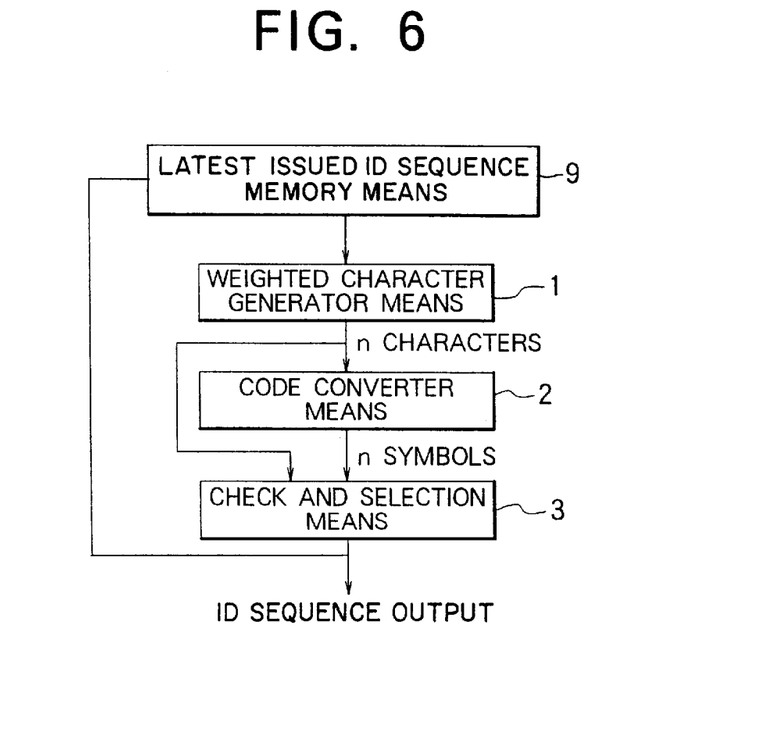
FIG. 6 is a block diagram showing the identification sequence issuing device an embodiment 6 of the present invention.

As an issuing method of the identification sequence of the present invention, for example, the identification sequence is efficiently generated by using the sequence according to the coding weight having one-to-one correspondence with a letter (character). FIG. 6 shows such an organization, which comprises latest issued ID sequence memory means 9 in addition to the organization in FIG. 1; in response to the weight of the code, the ID sequence candidate generator means 1 generates sequentially the identification sequence candidate having the next weight in succession to the weight of the identification sequence string stored in the latest issued ID sequence memory means 9, the code converter means 2 converts it into a code and the check and selection means 3 checks whether the code meets the rule of the identification sequence.

The coding weight is carried in the order of increasing or in the order of decreasing.

When the code fails to meet the rule of the identification sequence, the ID sequence candidate generator means 1 generates an identification sequence candidate with the next weight, and the check and selection means 3 checks whether the next code meets the rule of the identification sequence.

When it meets the rule of the identification sequence, the code is issued as an identification sequence, and the content of the latest issued ID sequence memory means 9 is updated with it as the latest issued identification sequence, and at the next issue, weighted character generator means 1 may generate the identification sequence candidate character string having the next weight in succession to the weight of the identification sequence string stored in the latest issued ID sequence memory means 9.

The above identification sequence generation method performs the generation or the additional identification sequence in the same manner as above by allowing the check and selection means 3 to follow the sequence shown in the flow diagram in FIG. 4.

Embodiment 7.

Figure 7:
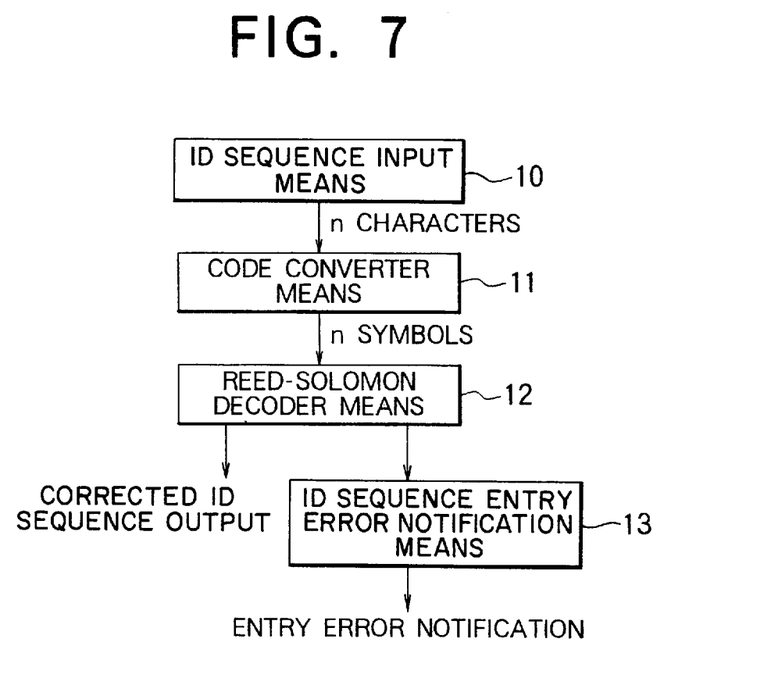
FIG. 7 is a block diagram showing the identification sequence issuing device of an embodiment 7 of the present invention.

As discussed above, the preceding embodiments have discussed the identification sequence issuing device for generating the identification sequence. This embodiment presents a verification device for checking the identification sequence. FIG. 7 shows its organization, in which there are shown an ID sequence input means 10 to which an identification sequence holder inputs their own identification sequence, code converter means 11 for converting into a code the identification sequence input by the ID sequence input means 10, Reed-Solomon code decoder means 12 for decoding the code converted by the code converter means into a Reed-Solomon code, and ID sequence entry error notification means 13 for notifying the identification sequence holder.

The operation of the device is now discussed. The identification sequence string input by the ID sequence input means 10 is converted into a code, character by character, by the code converter means 11. If a character which does not correspond to any code is input, a default code may be output in response or the ID sequence entry error notification means 13 may notify the identification sequence holder of an identification sequence entry error at that moment.

The Reed-Solomon code decoder means 12 decodes the code converted identification sequence string into the Reed-Solomon code, and corrects it if possible, and if not possible, the ID sequence entry error notification means 13 notifies the identification sequence holder asking them to enter the identification sequence again.

When the code string that is the result of correction fails to agree with any of the identification sequence candidates, the ID sequence entry error notification means 13 can notify the identification sequence holder asking for another entry of the identification sequence.

In the above description, the code converter means 11 outputs a default code if a letter (character) having no correspondence with any code is entered, but the character is regarded as the missing code position, missing code information is generated, and based on the missing code information, the Reed-Solomon code decoder means 12 performs correction of the miss.

Although in the above example, the correction operation is performed, detection capability can be increased by not performing the correction operation with detection only being performed using the syndrome based on the same Reed-Solomon code rule.

Although the present invention employs the Reed-Solomon code, other error correcting codes, such as BCH code, work in the same manner as the Reed-Solomon code.

According to a first aspect of the present invention, as described above, to cope with the first object, the identification sequence string issued to the user is converted in units of letter (character) into numeral codes, and only strings out of the numeral code strings that meet the condition as the Reed-Solomon code are selected, and thus the identification sequence issuing device is organized so that it gives an identification sequence the user can easily remember and both error detection and error correction are performed to.

According to a second aspect of the present invention, since the identification sequence is issued after the character string is converted to a 7-bit ASCII code having one-to-one correspondence to a character, the computer-based identification sequence issuing device is easily organized.

According to a third aspect of the present invention, a total of 36 characters inclusive of alphabet letters and numerals are used, and can be converted into a 6-bit code having one-to-one correspondence to a character; after the character string is converted into 6-bit codes, the identification sequence is issued, and thus the RS code rules and thus the strings that meet the RS code rules are increased, and identification sequences are issued in a larger quantity.

According to a fourth aspect of the present invention, a total of 26 characters of the alphabet letters are used, and can be converted into a 5-bit code having one-to-one correspondence to a character, and the character string can be converted into a 5-bit code even with letters or characters and numerals being at fixed positions in the string. Since the identification sequence is issued after it is converted into a 5-bit code, both the RS code rules and the strings that meet the RS code rules increase, the device according to claim 4 issues identification sequences in a larger quantity than the device according third aspect of the present invention with the same symbol correction capability remained unchanged.

According to a fifth aspect of the present invention, 16 characters of the alphabet letters are used, and can be converted into a 4-bit code having one-to-one correspondence to a character, and the character string can be converted into a 4-bit code even with 16 letters or characters and numerals being at fixed positions in the string. Since the identification sequence is issued after it is converted into a 4-bit code, both the RS code rules and the strings that meet the RS code rules increase, the device according to fifth aspect of the present invention issues identification sequences in a larger quantity than the device according to fourth aspect of the present invention with the same symbol correction capability remained unchanged.

According to a sixth aspect of the present invention, a plurality of roots of the generating polynomial of the Reed-Solomon code that is the issuing condition of the initial identification sequence string is used, and thus the device can issue the identification sequence that automatically corrects an entry error of the identification sequence.

According to a seventh aspect of the present invention, a plurality of roots of the generating polynomial of the Reed-Solomon code that is the issuing condition of the initial identification sequence string is used, and when additional identification sequences are issued after all identification sequences are fully issued under the issuing condition of the initial identification sequence string, identification sequences are additionally issued by reducing the conditions of the roots of the generating polynomial by 1; thus, the count of identification sequences issued is increased without prolonging the length of the identification sequence and without making the user aware of the additional identification sequence, and further, error detection and correction capability of the identification sequence is varied in accordance with the system.

According to an eighth aspect of the present invention, the device comprises memory means for storing the latest issued identification sequence, and imparts sequentially a weight to a code string that is going to be an identification sequence candidate, and checks whether the code string meets the generating polynomial; and therefore, the next additional identification sequence meeting the RS code rule is efficiently issued.

According to a ninth aspect of the present invention, a weight is sequentially imparted to a code string that is going to be an identification sequence candidate, the next additional identification sequence meeting the RS code rule is efficiently issued.

According to a tenth aspect of the present invention, the device comprises memory means for storing the latest issued identification sequence, and imparts sequentially a weight to a code string that is going to be an identification sequence candidate; therefore, the next additional identification sequence meeting the RS code rule is efficiently issued.

According to an eleventh aspect of the present invention, the identification sequence system according to a first aspect of the present invention meets the coding rule of the RS code, and thus an error in the identification sequence is detected according to the RS code by code converting the identification sequence string, and the identification sequence verification device that notifies the user of the error is presented.

According to a twelfth aspect of the present invention, since the identification sequence meets the coding rule of the RS code, the identification sequence verification device capable of error detection and error correction according to the RS code by code converting the identification sequence string is presented.

According to a thirteen aspect of the present invention, there is presented the highly reliable identification sequence verification device which is provided with checking function to detect strings that fails to meet the identification sequence issuing rule under correction process.

According to a fourteenth aspect of the present invention, there is presented the identification sequence verification device that has a higher correction capacity, because the position of a code that fails to meet the rule is decoded as a missing code in correction process when the input identification sequence is converted into the code.

What is claimed is:

1. An identification sequence issuing device for issuing an identification sequence constructed of a character string of letters, numerals and other characters, comprising:

code converter means for converting the character string into a into a string of character codes having one-to-one correspondence to the characters in the character string, and check and selection means for determining whether the string of character codes produced by the code converter means meets a Reed-Solomon code rule, each character code being a symbol of the Reed-Solomon code and the character code string length being the length of the Reed-Solomon code, and for selecting as an identification sequence the character string corresponding to the character code string that is determined to meet the Reed-Solomon code rule.

2. The identification sequence issuing device according to claim 1, wherein the code converter means converts the character string into a string of 7-bit ASCII character codes having one-to-one correspondence to characters in the character string, and the check and selection means selects as an identification sequence the character string corresponding to the string of character codes produced by the code converter means that meets a Reed-Solomon code rule of $GF(2^7)$ each character code being a symbol of the Reed-Solomon code and the character code string length being the length of the Reed-Solomon code.

3. The identification sequence issuing device according to claim 1, wherein the code converter means converts the character string into a string of 6-bit character codes having one-to-one correspondence to the characters in the character string, and the check and selection means selects as an identification sequence the character string corresponding to the string of character codes produced by the code converter means that meets a Reed-Solomon code rule of $GF(2^6)$ with each character code being a symbol of the Reed-Solomon code and the character code string length being the length of the Reed-Solomon code.

4. The identification sequence issuing device according to claim 1, wherein the code converter means selects 32 characters out of letters or numerals and converts the selected characters into a string of 5-bit character codes having one-to-one correspondence to the characters in the character string, and the check and selection means selects as an identification sequence the character string corresponding to the string of character codes produced by the code converter means that meets a Reed-Solomon code rule of $GF(2^5)$ with each character code being a symbol of the Reed-Solomon code and the character code string length being the length of the Reed-Solomon code.

5. The identification sequence issuing device according to claim 1, wherein the code converter means selects 16 characters out of letters or numerals and converts the selected characters into a string of 4-bit character codes having one-to-one correspondence to the characters in the character string, and the check and selection means selects as an identification number the character string corresponding to the string of character codes produced by the code converter means that meets a Reed-Solomon code rule of $GF(2^4)$ with each character code being a symbol of the Reed-Solomon code and the character code string length being the length of the Reed-Solomon code.

6. The identification sequence issuing device according to claim 1, wherein the check and selection means selects as an identification sequence, and the character string corresponding to the string of character codes produced by the code converter means meets a Reed-Solomon code rule of a generating polynomial having a plurality of Galois field elements as roots with each character code being a symbol of the Reed-Solomon code and the character code string length being the length of the Reed-Solomon code.

7. The identification sequence issuing device according to claim 6, wherein when all identification sequences that meets the Reed-Solomon code rule of the generating polynomial having the plurality of Galois field elements as roots are used, the check and selection means additionally selects as an identification sequence the character string corresponding to the code that meets a Reed-Solomon code rule of the generating polynomial having the plurality of Galois field elements with one Galois field element reduced.

8. The identification sequence issuing device according to claim 7 comprising:

memory means for storing the latest one of the identification sequences that are character strings, each constructed as a Reed-Solomon code and issued as an identification sequence according to the sequence of coding weight, and weighted character generator means for generating a character string which is going to be an input to the code converter means and which has the next weight in succession to the weight of the identification sequence stored in the memory means, whereby the check and selection means selects and issues as an identification sequence a character string except the identification sequences meeting the generating polynomial and already issued.

9. The identification sequence issuing device according to claim 1 comprising:

memory means for storing the latest one of the identification sequences that are character strings, each constructed as a Reed-Solomon code and issued as an identification sequence according to the sequence of coding weight, and weighted character generator means for generating a character string which is going to be an input to the code converter means and which has the next weight in succession to the weight of the identification sequence stored in the memory means, whereby the check and selection means selects and issues as an identification sequence a character string except the identification sequences meeting the generating polynomial and already issued.

10. An identification sequence verification device comprising:

input means for receiving an identification sequence having a character string encoded to meet a Reed-Solomon code rule, code converter means for converting the identification sequence into character codes having one-to-one correspondence to a character of the identification sequence, decoder means for decoding the character codes into a Reed-Solomon code and for detecting an error, and notification means for notifying a person who inputs the identification sequence, that the identification sequence entered is in error when the error is detected, wherein the decoder means detects an error in the identification sequence and corrects the identification sequence found to be erroneous, and recognizes the corrected data as an identification sequence.

11. The identification sequence verification device according to claim 10, wherein the decoder means checks whether the result of the error correction meets an identification sequence string rule.

12. The identification sequence verification device according to claim 10, wherein when there is no character code corresponding to an input character, the code converter means notifies the decoder means of the position of the corresponding character code string as a missing position and the decoder means corrects the missing error in response to the notification.

* * * * *